INVENTORS.
GORDON A. NELSON,
MELVIN C. SANDERS &
THOMAS M. CASEY
BY
ATTORNEYS

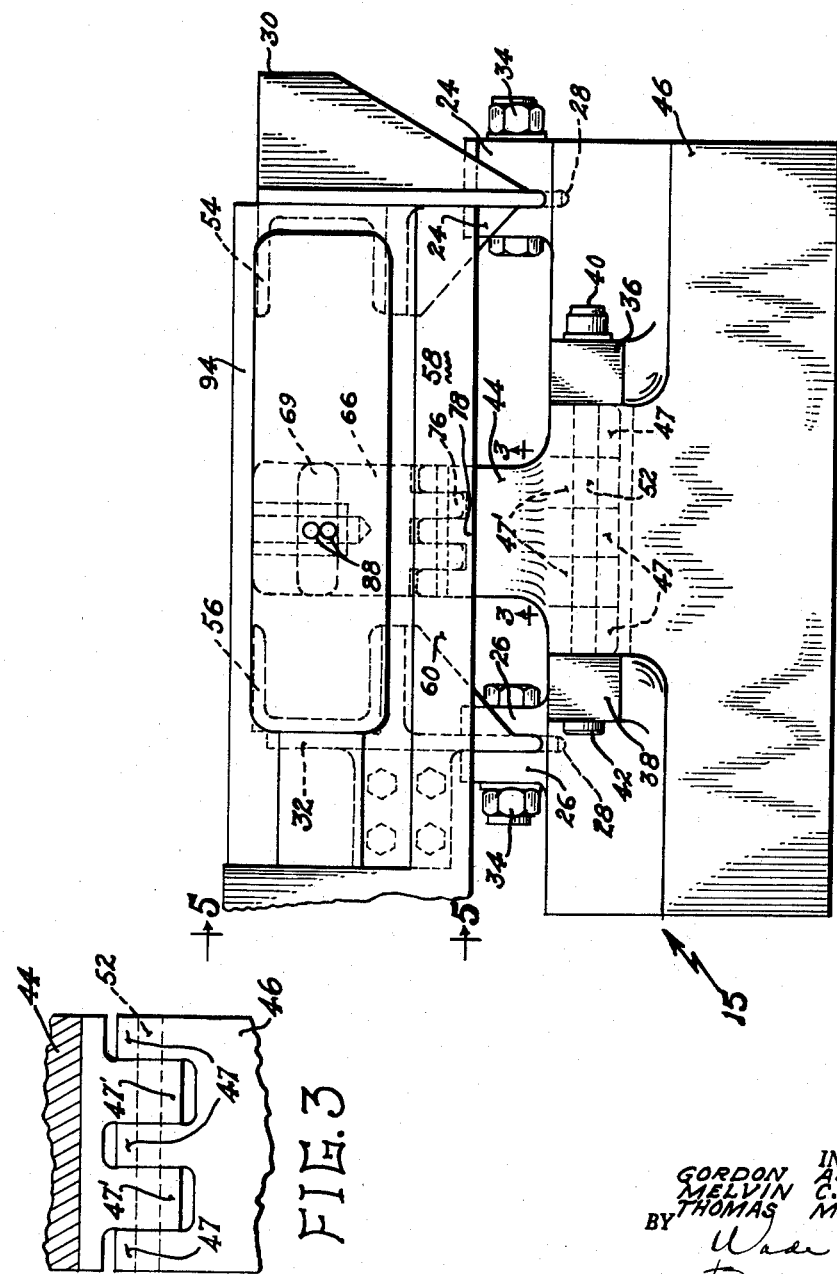

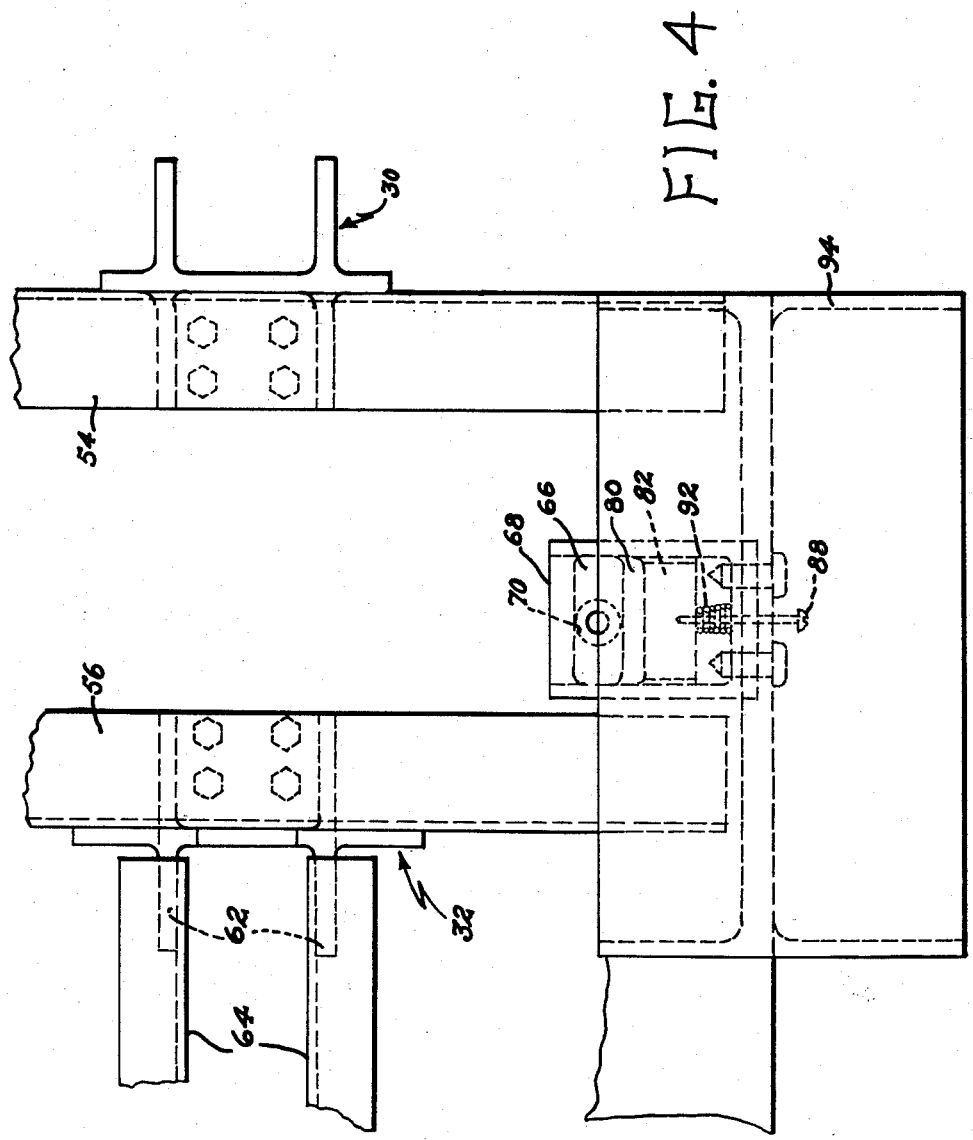

March 12, 1963  G. A. NELSON ETAL  3,080,826
MONO RAIL SLIPPER STABILIZER
Filed Feb. 23, 1962  6 Sheets-Sheet 4

INVENTORS.
GORDON A. NELSON,
MELVIN C. SANDERS &
BY THOMAS M. CASEY

ATTORNEYS

March 12, 1963 G. A. NELSON ETAL 3,080,826
MONO RAIL SLIPPER STABILIZER
Filed Feb. 23, 1962 6 Sheets-Sheet 5

INVENTORS.
GORDON A. NELSON,
MELVIN C. SANDERS &
BY THOMAS M. CASEY

ATTORNEYS

March 12, 1963

G. A. NELSON ETAL 3,080,826

MONO RAIL SLIPPER STABILIZER

Filed Feb. 23, 1962

INVENTORS.
GORDON A. NELSON,
MELVIN C. SANDERS &
BY THOMAS M. CASEY

ATTORNEYS

United States Patent Office 3,080,826
Patented Mar. 12, 1963

3,080,826
MONO RAIL SLIPPER STABILIZER
Gordon A. Nelson, Los Angeles, Melvin C. Sanders, Torrance, and Thomas M. Casey, Palos Verdes Estates, Calif., assignors to the United States of America as represented by the Secretary of the Air Force
Filed Feb. 23, 1962, Ser. No. 175,378
8 Claims. (Cl. 104—248)

This invention relates to a slipper stabilizing mechanism and more particularly to a device which functions to stabilize a high speed mono or multiple rail sled, capable of being propelled on land at extremely high speeds.

The use of wheelless land vehicles or sleds for attaining high speeds for research and experimental purposes, aircraft launching, and other general uses of high speed land sleds, presents problems which are multiple and acute. Some of these involve the difficulties in attaching a sled to a rail or rails in a manner to allow travel at great speeds while maintaining a stabilized connection and compensating for and removing clearance as parts wear away.

The object of the present invention is the provision of a stabilizing slipper for connecting a high speed sled to a ground rail or rails wherein the clearance between slipper and rail is continuously removed as wearing of the parts occurs. This is accomplished by providing a slipper element which comprises: (1) a central member attached to the sled and formed as an inverted U-shaped channel which encloses the top and side areas of the rail and is provided with inserts or buffers attached to the interior ceiling and side surfaces to lie in the hollow of the U-shaped channel and in engagement with the rail; and (2), a pair of side arms, each pivotally attached to the central member and at spaced points thereon and midway of their upper and lower extremities to function as bell crank levers. The upper portions of the side arms extend laterally and receive continuous pressure from a device for this purpose, later described, located on the sled while the lower end flange portions are directed inwardly and form pincers which are continuously pressed to compensate for wear on buffer or insert elements secured thereto for contact with the underneath surface of the rail. Pressure is transmitted through the upper portions or wing elements to the central member and compensation is thus afforded independently for wear on both sets of inserts commensurate with the amount of wear on each, although the source of pressure is common to both.

A further object of the invention is the provision of a mechanism for providing continuous and irreversible downward pressure so that close contact is maintained between all inserts and the surfaces of the rail or rails, regardless of the amount of wear on any of these parts.

These and other advantages, features and objects of the invention will become more apparent from the following description taken in connection with the illustrative embodiment(s) in the accompanying drawing(s), wherein:

FIGURE 2 is a side elevational view of the slipper, showing the adjusting mechanism in phantom; and showing in phantom the side arm interlocking tongue located at the longitudinal center of the device;

FIGURE 3 is a top view of the side arm interlocking tongues, substantially on the line 3—3 of FIG. 2;

FIGURE 4 is a top plan view of the device, showing the adjusting mechanism and bracket portions in phantom;

Figure 1:
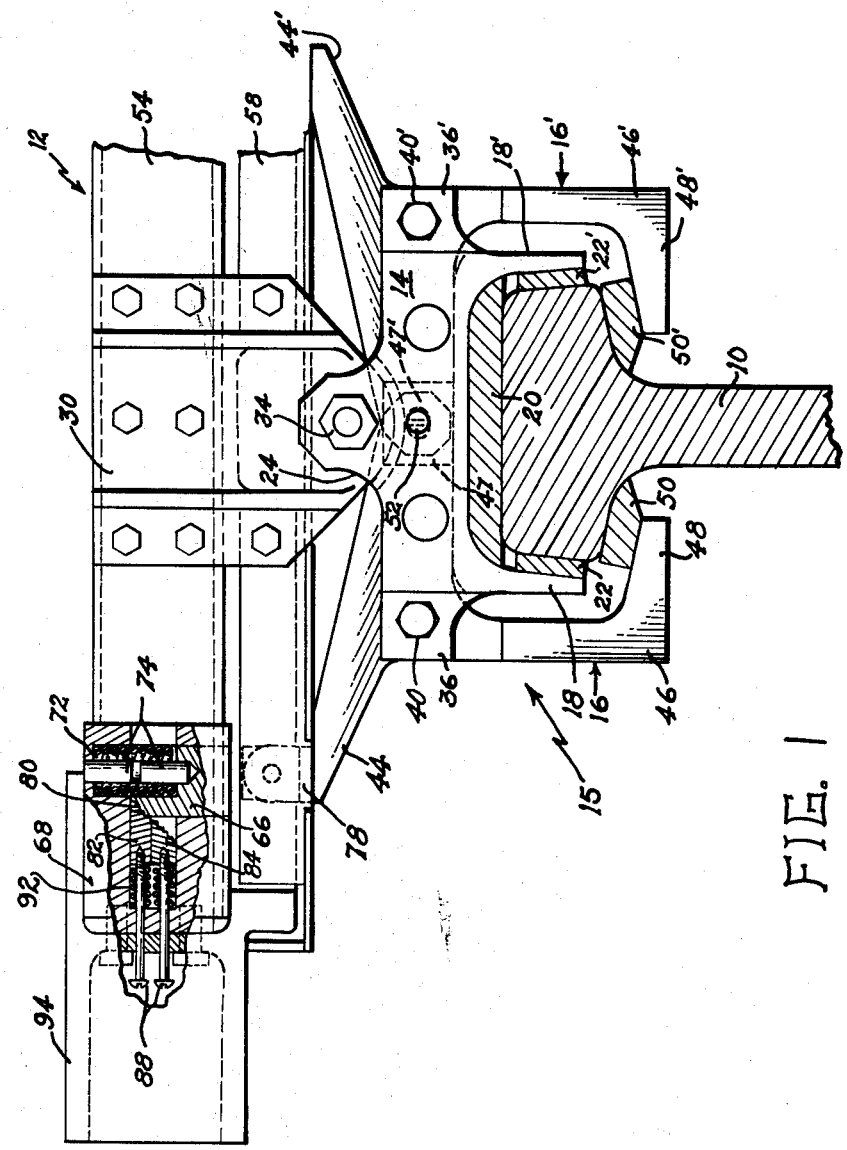
FIGURE 1 is an end view of a portion of a sled and rail connecting slipper, adapted particularly for a mono rail sled, showing the rail and inserts in cross section, a portion of the sled support being broken away to show the detailed construction of the adjusting mechanism in vertical cross section.

Referring more in detail to the drawing, wherein like reference numerals designate the same parts in the various figures of the drawing, the rail and sled are indicated by the numerals 10 and 12, respectively.

The stabilization of the sled is accomplished by providing a unique slipper construction for slidably attaching the sled to a rail of substantially T configuration in cross section and removing clearance occurring therebetween as the parts wear away.

This slipper construction, indicated generally at 15, comprises two main elements, a center support 14 and a pair of side arms 16 and 16'. The central support 14 is an inverted channel shaped member having downwardly extending walls 18—18' for partially enclosing the rail 10. A horizontally positioned insert 20, see FIG. 1, is secured to the upper channel wall of the support member 14, and a pair of inserts or buffers 22, 22' are inserted between walls 18 and 18' and the rail 10.

Figure 11:
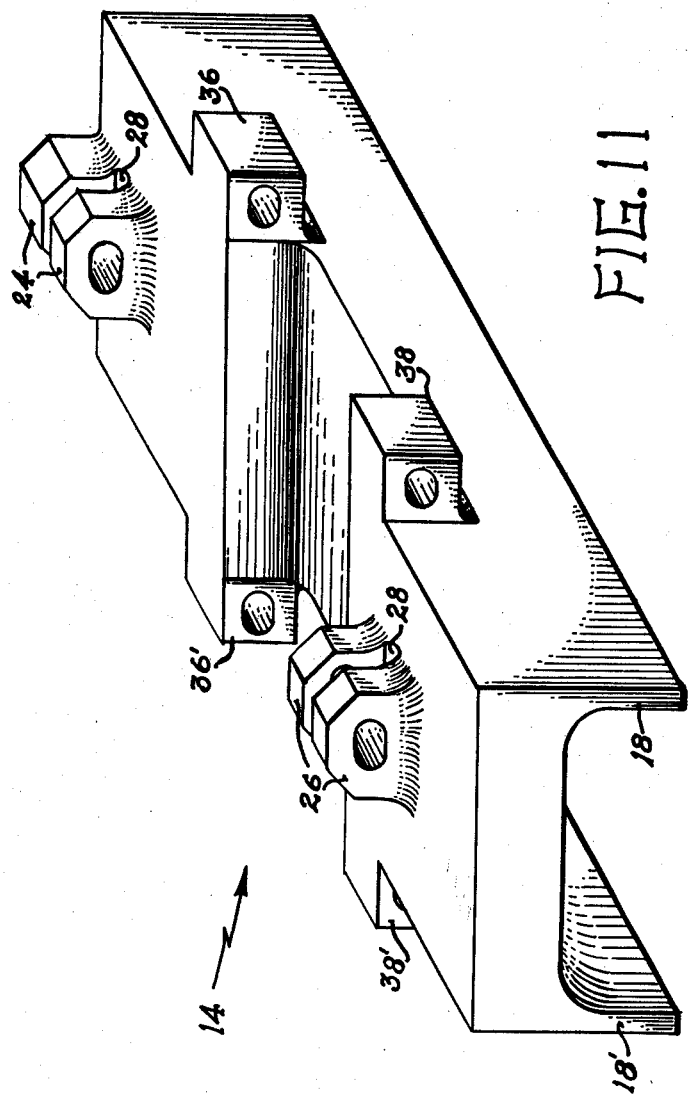
FIGURE 11 is a perspective view of the central member.

A pair of spaced upwardly extending lugs or tongues 24, 24 are located at one end of the central member, and a second pair 26—26 are located toward the opposite end of the central member and spaced from its end. See FIGS. 1, 2 and 11. Each spaced pair is provided with an intervening recess at 28, 28 for receiving the lower curved ends of brackets 30 and 32, and serve, in conjunction with bolts 34, 34 as securing means for attachment of central element 14 and sled 12.

Figure 10:
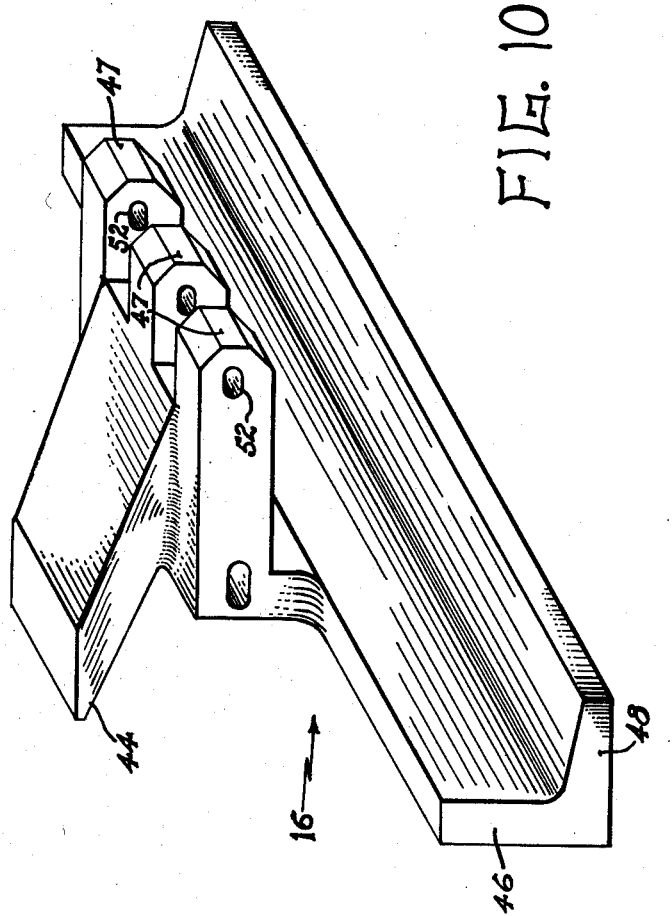
FIGURE 10 is a perspective view of the left side arm as viewed in FIG. 1.

Two pairs of laterally extending lugs or tongues 36, 38 and 36', 38' (FIGS. 1, 2 and 11), in conjunction with bolts 40, and 42, secure the side arms 16 and 16' to the support member 14 in a manner to allow a limited amount of play; see FIG. 1. Each of the side arms 16 and 16', as best shown in FIGURES 1 and 10, comprises three integral and functional portions: (1) upwardly and outwardly extending wings 44, 44', presenting flat upper surfaces which receive continuous pressure from an adjustment mechanism later described; (2) downwardly directed side walls 46, 46', each provided with inwardly directed hook flange elements 48, 48', to which are secured the inserts 50, 50'; and (3) inwardly directed elements which have overlapping tongue and groove ends, 47 on the left side arm as viewed in FIG. 1, and 47' on the right side arm, pinned to each other with a degree of play at 52 to insure concerted pincers action. FIGURE 10 shows the left side arm 16, with tongues 47.

Figure 5:
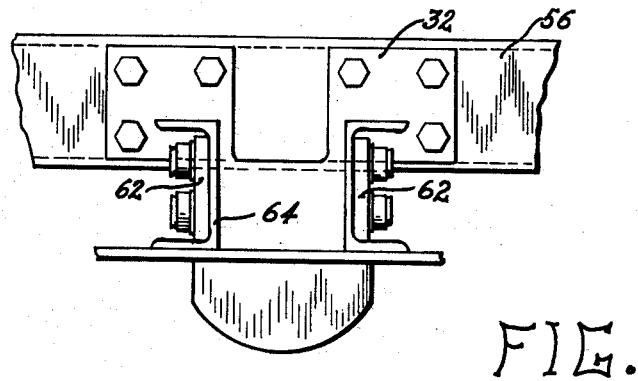
FIGURE 5 is an end view in elevation of one bracket, looking in the direction of the arrows 5—5 in FIG. 2.
Figure 6:
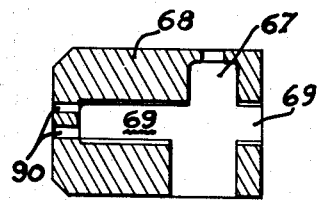
FIGURE 6 is a vertical cross section of the plunger housing.
Figure 7:
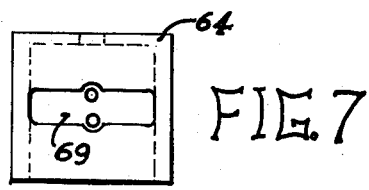
FIGURE 7 is an end view of the plunger housing.
Figure 8:
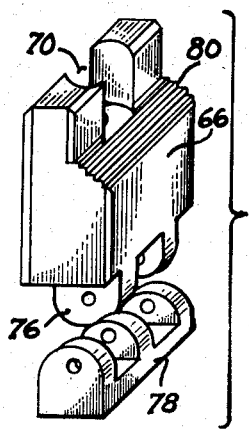
FIGURE 8 is an exploded perspective view of the plunger and pressure plate.
Figure 9:
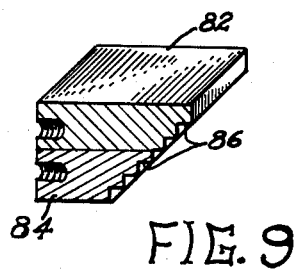
FIGURE 9 is a perspective and cross sectional view of the ratchet plates.

The brackets 30 and 32 form the connecting elements between slipper 15 and channel bars 54, 56, and 58, 60. These bars are elements of the sled and may take any expedient form. Rearwardly extending flanges 62, 62 on the bracket 32, support channel bars 64, 64, see FIGS. 4 and 5.

As will now be seen, the side arms 16, 16' will function as bell crank levers, pressure on either or both wings causing pincers movement of the hook flanges 48, 48', thus compensating for wear on inserts 50, 50'. It will now be apparent also that downward pressure on the wings will also cause downward pressure on the central member 14, and through the connection affording play between the central member and the side arms, wear on the insert 20 is compensated for as needed.

The above noted adjustment mechanism, which exerts a continuous downward pressure on wings 44—44' is an irreversible ratchet type mechanism mounted on the sled. One such mechanism is shown in the drawing, and only one will be described. It is to be understood, however, that such a device is provided for each wing element.

A spring biased plunger 66 is housed within a vertical slot 67 in the ratchet housing 68. See FIGS. 1, 6, 7 and 8. An open sided circular bore 70 in the plunger 66, together with the upper portion of the vertical slot 67 in the housing 68, provide a recess for the compression spring 72, held in place by a pair of vertically aligned pins 74. Lugs 76 on the lower end of the plunger 66 are pinned for limited hinged movement to the pressure plate 78. As will now be seen, the pressure plate 78 rides on the flat upper surface of the wing 44, is able to pivot slightly, and exerts a continuous pressure on the wing 44.

A mechanism has also been provided, once a downward movement of the plunger has made compensation for wear on the inserts, to prevent a reverse upward movement, so that close fitting of all of the parts of the slipper inserts with the surfaces of the rail is continuously maintained. This is accomplished by the following device: The plunger 66 is provided in its upper mid section with a set of ratchet teeth or steps 80. The member 68 also houses, in a horizontally positioned slot 69, a pair of ratchet plates 82 and 84 having teeth or steps 86 complementary to and capable of engagement with steps 80. A pin 88 has rigid attachment, such as the screw threaded engagement shown in FIG. 1 to each of the plates 82, 84, and extends through openings 90, 90 to the exterior of the housing 68. Compression springs 92, 92, located in the horizontal slot 69, surround the pins 88, 88 and exert continuous pressure on the ratchet plates 82, 84, biasing them into continuous contact with the ratchet steps on the plunger 66. Downward motion of the plunger bar 66 is allowed, and takes place in amount commensurate with the wearing of the inserts, as above described. A return upward motion is, however, prevented.

The pins 88, 88 may be manually manipulated to relieve pressure on the plates 82, 84, if such is desired for the adjustment or readjustment of the plunger 66. The pins 88, 88 are protected from inadvertent withdrawal by the protective housing 94, a double channeled member, serving also to receive the ends of the channel rails 54 and 56.

It will now be understood that the wear on inserts 20 and 22, 22' located between the rail and the central support member, is taken care of independently of the adjustment of the pincers elements 48, 48' which provide pressure on the inserts 50, 50'. This is true even though a common source; namely, the pressure exerted on the wings 44, 44', provides the pressure for both. Due to the unique arrangement of wing and central support connections allowing pivotal play, pressure is supplied to all locations as it is required, and is commensurate with the amount of wear on inserts at each individual location.

Although the invention has been described with reference to a particular embodiment, it will be understood to those skilled in the art that the invention is capable of a variety of alternative embodiments within the spirit and scope of the appended claims.

We claim:

1. A wear compensating device for a land sled designed for high speed travel along a rail of substantially T configuration in cross section, said device comprising: a central support member attached to said sled for limited vertical play, a pair of bell crank lever systems each pivoted for a degree of play to laterally spaced positions on said central support member, each of said bell crank lever systems comprising an upwardly and laterally extending wing, and a downwardly and inwardly extending pincers element, pressure means positioned on said sled for exerting continuous downward pressure on said wing for effecting inward and upward movement of said pincers elements, and downward movement of said central support, a system of buffer elements comprising one set of inserts attached to said support member and positioned between said support member and the top and side surfaces of said rail, a second set attached to said pincers elements and positioned between said pincers elements and the underneath surfaces of said rail, means for exerting pressure on said wings, said bell crank lever systems operating, responsive to pressure exerted thereon from said pressure means, to cause downward movement of said central member and thus provide compensation for wear on said first set of inserts commensurate with actual wear thereon, and operating also to cause pincers movement of said pincers elements to provide compensation for wear on said second set of inserts commensurate with actual wear present.

2. A mono rail sled comprising slipper means for attaching said sled to a rail of substantially T cross section for high speed travel therealong, said slipper comprising a central element attached to said sled and a pair of side arms, each secured at points intermediate its longitudinal extent to opposed lateral positions on said central element for bell crank lever operation, buffer inserts attached to said central element and located to contact the upper surface and the side surfaces of said rail, buffer elements attached to said side arms, and located to contact the underneath surfaces of said rail, means for providing continuous downward pressure on the upper extremities of said side arms, thereby producing downward movement of said central member, and producing also inward and upward pincers movement of the lower extremities of said side arms to compensate for wear occurring on each of said buffer elements.

3. In a land sled, a slipper element for securing said sled to a rail of substantially T cross section for high speed travel therealong, said slipper comprising a central support and a pair of side arms, means for attaching said central support to said sled, pivotal means for attaching each of said side arms at points intermediate its longitudinal extremities to lateral positions on said support member for bell crank lever action, a wing in the upper extremity of each of said side arms, a pincers element on the lower extremity of each of said side arms, means positioned on said sled for exerting continuous downward pressure on each of said wings, thereby effecting downward pressure on said central element, to effect downward movement thereof, and concerted pincers action by said pincers elements, thus compensating for wear of buffer elements inserted between said slipper and said rail.

4. In a mono rail sled, wherein a sled is attached to a rail of substantially T cross section for high speed travel therealong, a slipper, buffer elements attached to said slipper and inserted between said slipper and top, side and under surfaces of said rail, means for providing continuous downward pressure, on some of said buffer elements and continuous pincers pressure on others of said buffer elements to compensate for wear thereof, said means comprising a central support attached to said sled, a pair of side arms, each pivoted at points intermediate its longitudinal extent to laterally spaced positions on said central support, and operating in concert as bell crank levers to provide continuous pincers action at the lower extremity of each, responsive to pressure applied on the opposite upper end of each, and means for applying such pressure.

5. A device for attaching a high speed land sled to a rail of substantially T configuration in cross section for stabilizing said sled and continuously removing clearance caused by wear, said device comprising a sled, a bracket attached to said sled, an inverted channel shaped center support member comprising depending side walls, a centrally located lug for attachment to said bracket and pairs of laterally positioned lugs, a pair of side arm elements pivotally attached to each other for limited pivotal movement with respect to each other, depending flange and hook portions on each of said side arms for fitting around and hooking under said center support and under portions of said rail, a wing member on each of said side arms centrally located with respect to the longitudinal extent of each of said arms, pivotal means on each of said side arms for attachment to the side lugs of said central support to provide bell crank lever action of said side arms and pincers movement of said hook portions, a top insert and a pair of side inserts located between the top and sides of a rail and said central channel member, a second set of inserts comprising a pair, one attached to each of said side arms and located between said hook portions and the under portions of said rail, pressure means mounted on said sled contacting each of said wings to exert continuous downward pressure on said wings, whereby movement of said central member responsive to pressure of said pressure means on said wings is commensurate with and compensates for wear on said top and side inserts, and whereby downward movement of said wings effects also a pincers movement of said hook portions commensurate with and compensating for wear on inserts attached to said hook portions.

6. A stabilizing slipper construction for attaching a land sled to a rail of substantially T cross section for high speed travel of said sled therealong, said slipper construction comprising an inverted U-shaped central support member attached to said sled, side walls on said central member for encompassing top and side areas of said rail, a bell crank lever system comprising a pair of side arms, upwardly and laterally extending wings and overlapping lugs on each of said side arms, and means for attaching said lugs together for limited pivotal play, a downwardly and inwardly extending flange member on each of said side arms for partially encompassing the side walls of said central support and a portion of the under surfaces of said rail, inserts secured to the inwardly projecting portions of said side arms and forming buffers between said portions and the undersurfaces of said rail, pivotal means for attaching said bell crank lever systems to said central member, pressure means mounted on said sled, biased continuously downward for providing irreversible downward movement for exerting continuous downward pressure on said wing members, downward movement of said wing members effecting pincers movement of said inwardly extending flanges, and downward movement of said central support member to provide compensation for wear on inserts, said compensation being always commensurate with the wear sustained by said elements.

7. A device for exerting continuous and irreversible pressure on the surface of a plate capable of limited pivotal motion about an axis outside of said plate, said device comprising a spring biased plunger, steps formed on said plunger intermediate the vertical extremities thereof, and extending outwardly and downwardly thereon, a spring biased ratchet plate, steps on said ratchet plate capable of engaging the steps formed on said plunger to allow movement of said plunger in one direction and prevent movement of said plunger in the opposite direction, a pressure plate mounted on one end of said plunger, and pivoted thereto for movement about a horizontal axis, and mounted to contact said surface.

8. In a mono-rail sled, a stabilizing, wear compensating slipper attachment for attaching said sled to a rail of substantially T cross section, said slipper attachment comprising pincer means encompassing said rail, buffers inserted between said pincer means and the underneath portions of said rail, means located on said sled for exerting irreversible pressure on said pincers means thereby compensating for wear on said buffers.

No references cited.